April 21, 1959 — L. A. LEIFER — 2,882,760
INFINITELY VARIABLE INCREMENT FEED CONTROL
Filed Nov. 30, 1955 — 3 Sheets-Sheet 1
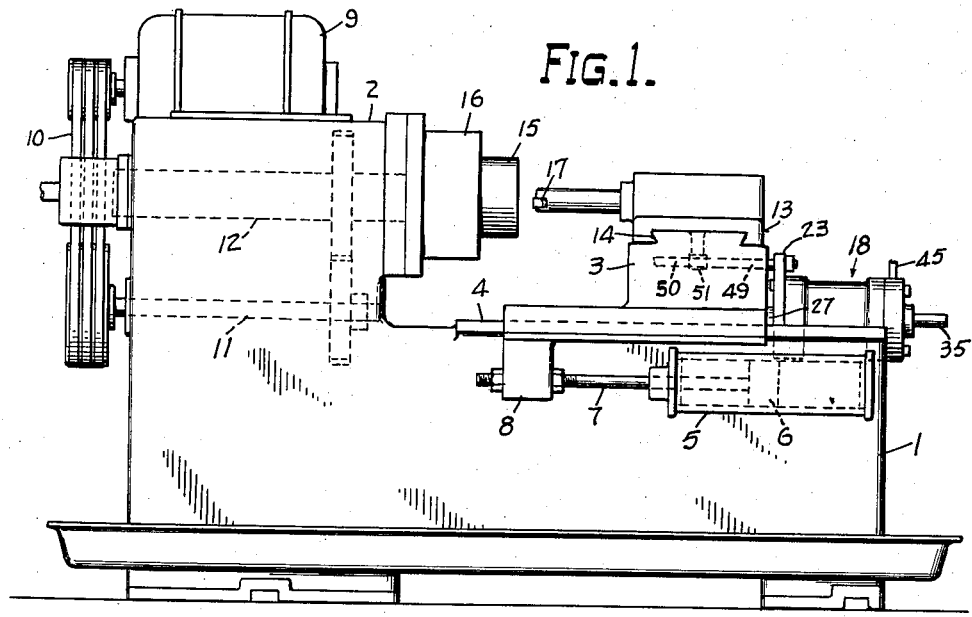
FIG. 1.
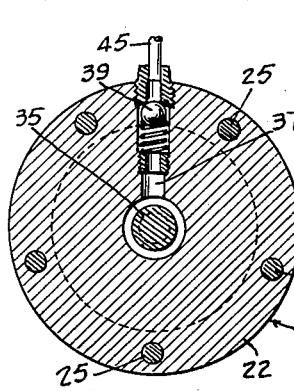
FIG. 11.
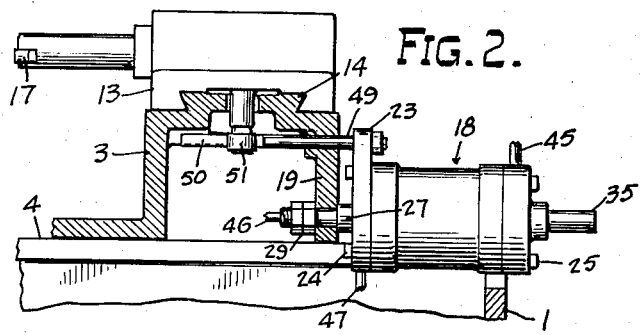
FIG. 2.
FIG. 3.
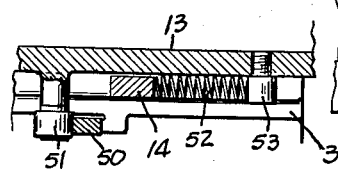
FIG. 4.
INVENTOR.
Lorenz A. Leifer
BY Andrus & Sceales
ATTORNEYS.

April 21, 1959 — L. A. LEIFER — 2,882,760
INFINITELY VARIABLE INCREMENT FEED CONTROL
Filed Nov. 30, 1955 — 3 Sheets-Sheet 2
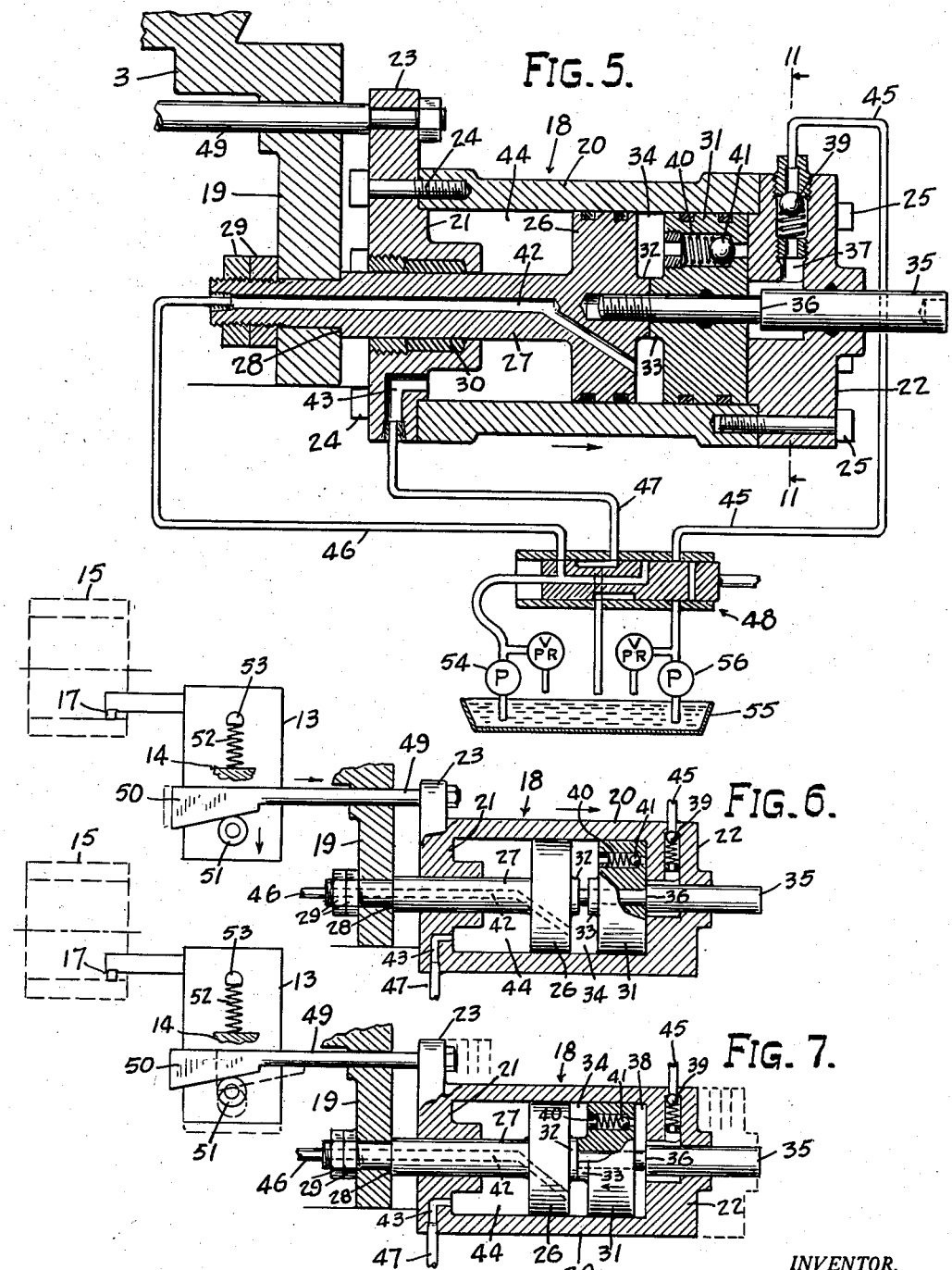
INVENTOR.
Lorenz A. Leifer
BY
ATTORNEYS.

April 21, 1959

L. A. LEIFER 2,882,760

INFINITELY VARIABLE INCREMENT FEED CONTROL

Filed Nov. 30, 1955

INVENTOR.
Lorenz A. Leifer
BY Andrus & Sceales
ATTORNEYS.

United States Patent Office 2,882,760
Patented Apr. 21, 1959

2,882,760

INFINITELY VARIABLE INCREMENT FEED CONTROL

Lorenz Albert Leifer, Madison, Wis., assignor to Gisholt Machine Company, Madison, Wis., a corporation of Wisconsin Application November 30, 1955, Serial No. 549,962

20 Claims. (Cl. 77—3)

This invention relates to an infinitely variable increment feed control, and more particularly to a depth of cut control for machine tools or the like where a multiplicity of passes is required to obtain the finished product.

The invention is particularly adapted for use with automatic cam turning or grinding lathes. In these machines it is often desirable to machine regular or irregular workpieces by utilizing a plurality of passes of the cutting or grinding tool. With each succeeding pass, the tool is advanced so as to cut an additional increment into the workpiece until the piece is completed.

Heretofore, such tools have been advanced by mechanical ratchet devices utilizing racks, ratchet gears, pawls and the like. The difficulty with such devices has been that their adjustment, and thus the amount of tool increment advance, was limited by the number and spacing of teeth in the ratchet gear or rack. Since each different type of workpiece required a different number of passes and a different depth of cut for the passes, the ratchet mechanism had to be substantially altered for each new type of workpiece.

The present invention overcomes the difficulties inherent in the gear-type ratchet control, and provides a novel hydraulic ratcheting system having infinitely adjustable steps within a given range.

The accompanying drawings illustrate the best mode presently contemplated by the inventor for carrying out the invention.

In the drawings:

Figure 1 is a front elevation of a lathe utilizing the increment control device;

Fig. 2 is an enlarged detail section of the lathe carriage;

Fig. 3 is a plan view, partially in section of the carriage and tool holder;

Fig. 4 is a fragmentary sectional view on line 4—4 of Fig. 3 showing the tool holder biasing spring;

Fig. 5 is a longitudinal section of the ratcheting cylinder in its initial position, and diagrammatically showing the hydraulic system;

Fig. 6 is a diagrammatic view of the ratcheting cylinder showing the position after the first stroke;

Fig. 7 is a diagrammatic view of the cylinder showing the position after return of the floating piston, preparatory for the second stroke and indicating in dotted lines the several subsequent positions of the cylinder.

Fig. 11 is a detail section taken on line 11—11 of Fig. 5.

Figure 8:
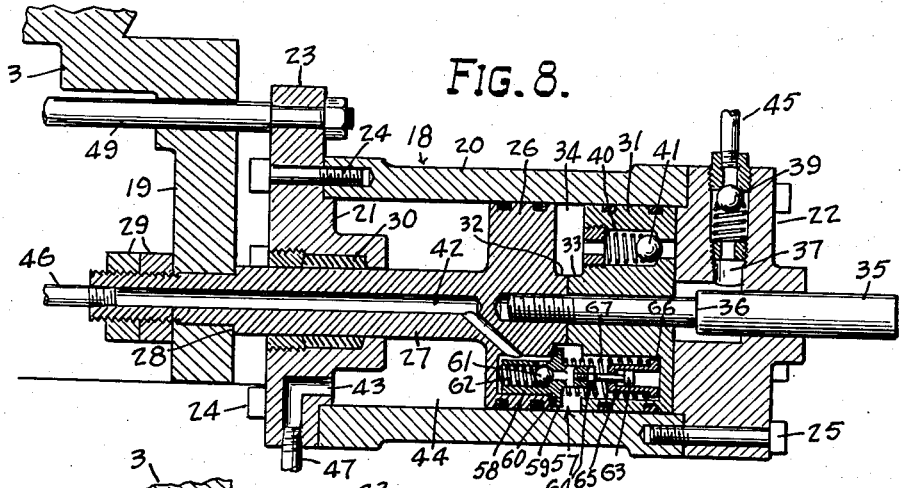
Fig. 8 is a fragmentary vertical longitudinal section of the cylinder in initial position, showing a modified form of the invention.

As shown in the drawings, the invention is adapted for use with a lathe having a bed 1, a headstock 2 and a movable carriage or table 3 disposed on the bed to move toward and away from the headstock into and out of operative position.

The bed 1 is generally short and has a longitudinal way 4 upon which carriage 3 moves. A power cylinder 5 is mounted on bed 1, and has a piston 6 with a forwardly extending piston rod 7 for moving the carriage. For this purpose, piston rod 7 has its forward end secured to a bracket 8 which depends from carriage 3. Piston 6 is moved within cylinder 5 to move piston rod 7 and carriage 3 by hydraulic fluid supplied to the cylinder from any suitable source, not shown.

The headstock 2 of the lathe has a spindle drive motor 9 mounted thereon and connected by means of multiple V-belts 10 to a main drive shaft 11 in the headstock. Drive shaft 11 is connected to drive the lathe spindle 12 in the headstock 2 by means of any suitable transmission mechanism.

The carriage 3 supports a tool slide 13 which is mounted on a suitable way 14 preferably adjustably bolted to carriage 3 in a selected angular position relative to the axis of spindle 12. In the construction shown, slide 13 has its way 14 disposed to obtain a slide movement transverse to the axis of spindle 12 for depth for cut control.

The workpiece 15 in the present instance is illustrated as a cylindrical ring which is to be machined to provide the proper internal surface. The blank 15 is secured in a chuck 16 carried by spindle 12. The chuck 16 is actuated by a suitable air cylinder, not shown, through the hollow spindle 12, as is customary with lathes.

In carrying out the machining operations, it becomes necessary to employ repeat cuts for the internal boring operations since the depth of cut necessary to provide the proper surface is often too great for a single cut operation. In general, this is accomplished by mounting the cutting tool 17 on slide 13 and changing the position of slide 13 to effect the desired adjustment for the depth of cut for each successive cutting operation.

This is accomplished by a hydraulic ratcheting assembly, indicated generally at 18, which is mounted on the right wall 19 of carriage 3 away from headstock 2.

As best shown in Fig. 5, assembly 18 comprises a ratcheting cylinder having a cylindrical body portion 20 which is closed and sealed by forward head 21 and rear head 22. Head 21 is substantially circular and has an upwardly extending projection 23 utilized in a manner to be described. Head 21 is sealably joined to the forward end of body 20 by a plurality of circumferentially spaced machine screws 24 which pass through head 21 and are threaded into body 20.

Rear head 22 is of substantially circular configuration and is sealably joined to the rearward end of body 20 by circumferentially spaced screws 25 which pass through head 22 and are threaded into body 20.

The forward portion of the ratcheting cylinder is slidably mounted on a piston 26 disposed within the cylinder and circumferentially sealed against the inner wall of body 20 and a piston rod 27 which extends forwardly from piston 26, through forward head 21 and wall 19. The outer end portion of rod 27 which passes through wall 19 is of slightly less diameter than the remainder of the rod to form a shoulder 28. Rod 27 is threaded on its extreme forward end to receive nuts 29 which tighten shoulder 28 against wall 19 and thereby rigidly secured the rod to the wall.

To prevent leakage of hydraulic fluid through the head end of the ratcheting cylinder, a packing seal 30 is provided between forward head 21 and piston rod 27.

When the cylinder is at its most retracted position piston 26 is disposed a substantial distance from rear head 22, thereby allowing space for a floating piston 31 which is slidably disposed between piston 26 and head 22. Piston 26 and floating piston 31 may be provided with complementary longitudinally extending facing bosses 32 and 33 respectively, of substantially small diameter. When piston 31 is in its initial position, bosses 32 and 33 will be in engagement to provide an annular space or chamber 34 between piston 26 and piston 31 and extending from the bosses to the inner surface of cylinder body 20.

Piston 26, floating piston 31 and rear head 22 are provided with axial openings to receive an adjustment screw 35 which is threadably secured at its inner end in an opening in piston 26. Screw 35 is provided with a shoulder 36 approximately midway of its length which is adapted to be engaged by the outer face of piston 31 to limit the step distance in each feeding stroke of the control, as will be described.

A radial passage 37 is disposed in rear head 22 to allow passage of fluid from the outside of assembly 18 into a space or chamber 38 between piston 31 and head 22. Passage 37 is in communication with chamber 38. A spring-pressed ball check valve 39 is disposed in passage 37 to prevent fluid from passing outwardly from chamber 38.

A longitudinal opening 40 is disposed in piston 31 to provide a connection between chamber 34 and chamber 38 for passage of fluid. A spring-pressed ball check valve 41 is disposed in opening 40 to allow only inward passage of fluid into chamber 34 from chamber 38.

A passage 42 is disposed along the longitudinal axis of piston rod 27 and extends from the outer end of the rod and inwardly to adjacent the piston 26 and hence diagonally outwardly within piston 26 and opening into chamber 34.

A passage 43 is disposed in forward head 21 and communicates with a space or chamber 44 between head 21 and piston 26, for purposes to be described.

Passages 37, 42 and 43 are connected by conduits 45, 46 and 47 respectively to a suitable valve 48 which permits supply of fluid to and withdrawal of fluid from the ratchet assembly 18.

A rod 49 is bolted at one end to the projection 23 on head 21, and extends longitudinally toward headstock 2 through wall 19 into carriage 3 beneath tool slide 13. A cam 50 is secured to rod 49 beneath tool slide 13 and is adapted to engage a cam follower 51, which is secured to slide 13 and extends downwardly therefrom. A spring 52 is disposed in a slot in way 14 and is adapted to engage a downwardly extending abutment 53 which is secured to tool slide 13 to bias slide 13 so that follower 51 is in engagement with cam 50 at all times.

Movement of cam 50 away from headstock 2 moves cam follower 51, tool slide 13 and tool 17 radially away from the axis of spindle 12. Movement of cam 50 toward headstock 2 permits the spring 52 to move the tool slide 13 and tool 17 radially toward the axis of the spindle.

Operation of the device is as follows: Assuming that a workpiece 15 is secured in chuck 16, carriage 3 is moved forward until cutting tool 17 is adjacent the work-piece in a transverse plane with the end thereof. The interior of the workpiece must be cut with a plurality of passes, each pass requiring a placement of the tool radially outwardly from the next preceding position.

The initial position of the ratcheting assembly 18 is shown in Fig. 5. Assuming that tool 17 must be moved radially outwardly a distance equal to the depth of cut for the first pass so that the workpiece will be properly engaged for the first pass, adjustment screw 35 is first turned to adjust the travel of the piston 31 which will proportionately determine the depth of cut for each pass.

Valve 48 is then set so that pressurized fluid from a suitable high pressure pump 54 is supplied through conduit 46 into passage 42 and chamber 34 between piston 26 and floating piston 31, causing piston 31 to move against rear head 22 so that it advances away from wall 19 of carriage 3 until piston 31 is stopped by shoulder 36 on screw 35, as shown in Fig. 6. This initial advance of the ratchet cylinder relative to piston 26 pulls rod 49 and cam 50 away from headstock 2 and, through follower 51, moves tool slide 13 so that tool 17 will cut a first pass of regulated depth.

As the ratchet cylinder is advanced away from the carriage, any excess fluid in chamber 44 drains out through passage 43, conduit 47 and valve 48 to a suitable sump 55.

When the first advance has been completed, valve 48 is set so that pressure enters through passage 37 from a suitable low pressure pump 56 and into chamber 38, pushing floating piston 31 back against piston 26, as shown in Fig. 7, excess fluid in chamber 34 draining out through passage 42. Valve 48 prevents any tendency of the ratchet cylinder to retract during retracting of piston 31 by blocking off passage 43. The pressure is sufficiently low to prevent ball check valve 41 from being unseated.

The first advance may be used to position the tool so that a cut will be made in the workpiece upon the first advance of the carriage. Motor 9 may be started either before the first cylinder advance or just after but before advance of the carriage.

Subsequently, carriage 3 is advanced toward headstock 2 for the first pass. After completion of the first pass, carriage 3 may be retracted before the second pass or the tool 17 advanced again and the second pass made by moving the carriage away from the headstock.

To provide the proper depth of cut for the second pass, valve 48 is again set to supply pressure from pump 54 through passage 42 and into chamber 34. Since the fluid that entered passage 37 to retract piston 31 is trapped by the ball check valve 39 in rear head 22, the entire cylinder advances away from the carriage a distance equal to the distance of the previous advance, until piston 31 is stopped by shoulder 36.

Subsequently, valve 48 is set to provide low pressure from pump 56 through passage 37 and into chamber 38 to retract piston 31 until bosses 32 and 33 are in engagement.

Further radial tool feeds for additional passes may be accomplished by additional step-by-step cylinder advances similar to those described above, as shown in Fig. 7.

When workpiece 15 has been completed, it is desirable to retract the cylinder to its initial position so that cam 50 will move forward and allow cam follower 51 and the spring biased tool slide 13 to move radially away from workpiece 15 toward the axis of spindle 12. In order to accomplish this, valve 48 is set so that high pressure from pump 54 is supplied through conduit 47 and passage 43 into chamber 44. This will return the ratchet cylinder 20 to its initial position, as shown in Fig. 5. In so doing any excess fluid in chamber 34 will drain through passage 42 and conduit 46 back to sump 55. The high pressure applied will be sufficient to unseat ball check valve 41 in piston 31 so that accumulated fluid in chamber 38 will pass to chamber 34 and hence to drain via passage 42 and conduit 46.

The depth of cut for any series of passes is infinitely adjustable due to the adjustment screw 35 which may be set for any desired distance of cylinder advance in each cycle, limited only by the particular cylinder dimensions.

In some instances, it may be desirable to provide a larger cylinder advance during the first cycle than is needed for subsequent advances. This may be accomplished by the modification shown in Figs. 8, 9 and 10.

Facing recesses are formed in piston 26 and floating piston 31, and an index valve, indicated generally by the numeral 57, is disposed within the recesses and extends therebetween through chamber 34. In this instance, the inner end portion of passage 42 extends into the recess in piston 26 instead of directly into chamber 34. The portion of valve 57 within piston 26 comprises a cylindrical housing 58 extending from adjacent the inner end of the recess and outwardly. Housing 58 is provided with an annular flange 59 disposed slightly inwardly of the outer end of the housing and which has an annular O-ring seat 60 on its inner surface which is adapted to be seated against the piston 26 to close off its respective recess. The housing 58 is flattened at its upper side to provide a passage for fluid between passage 42 and chamber 34 when O-ring 60 is unseated. Housing 58 is hollow and would allow passage of fluid therethrough, except for a spring-pressed ball check valve 61 which prevents fluid from passing through housing 58 into chamber 34 at all times, and allows reverse flow through the housing only when the fluid in chamber 34 is under a high pressure, as when pressure fluid is supplied through passage 43.

A spring 62 within the housing 58 is interposed between the inner end of the piston recess and the ball 61 to seat the same. Spring 62 thereby serves two functions: (a) It seats ball 61 and (b) biases housing 58 outwardly to unseat O-ring 60.

The outer end portion of housing 58 has a threaded axial bore to receive the shank end of an adjustable plunger 63 which is threadably secured within the housing by a nut 64. The shank of plunger 63 passes through an opening in the end of a hollow cylindrical housing 65 disposed in the recess in floating piston 31, the head on the end of the plunger being disposed within housing 65. The housing 65 is provided at its outer end with an annular flange 66 which is adapted to seat one end of a strong horizontal spring 67, the other end of the spring being seated against the outer surface of flange 59 of housing 58. Spring 67 serves to bias flanges 59 and 66 away from each other to seat the head of plunger 63 against the inner end wall of housing 65, through which the shank of plunger 63 passes.

When the ratcheting cylinder is in its initial position, shown in Fig. 8, the distance between flange 59 and flange 66 is such that spring 67 is preloaded to a high initial compression many times as high as the compression of spring 62.

Operation of index valve 57 to increase the ratchet cylinder advance during the first stroke will now be described.

Figure 9:
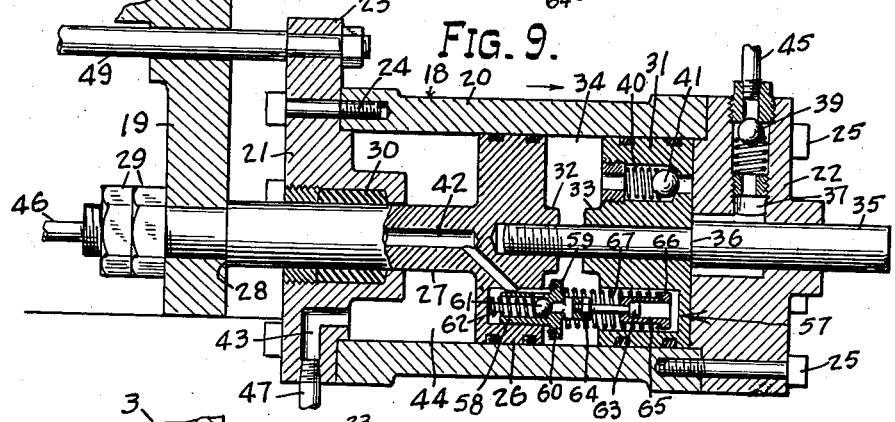
Fig. 9 is a diagrammatic view of the modified cylinder, showing the position after the first stroke.

Assuming that the ratcheting cylinder and floating piston 31 are in their initial position shown in Fig. 8, adjustment screw 35 is set so that the space between shoulder 36 and piston 31 would allow a cylinder stroke equal to the increased advance desired for the first stroke. Fluid is then pumped through passage 42, in the same manner as was previously described, and into the recess in piston 26 supporting housing 58. The fluid pushes outwardly on flange 59 and passes around O-ring 60 into chamber 34 to push piston 31 outwardly against head 22 until piston 31 engages shoulder 36. As piston 31 moves outwardly spring 67 biases housing 65 outwardly until it is stopped from further movement by the head of plunger 63 being seated, as above described. Further outward movement of piston 31 causes spring 62 to bias the entire index valve 57 rearwardly as a unit, unseating flange 59. This is shown in Fig. 9.

After the initial stroke, which is longer than the subsequent tool feed strokes, passage 42 is connected to drain and fluid is pumped through passage 37 into chamber 38. Floating piston 31 will move back toward piston 26. Fluid will pass out through passage 42 which is now connected to drain. As piston 31 returns toward piston 26, it will again engage housing 65 and move the entire valve 57 toward piston 26 and against the tension of spring 62. When sufficient reaction has taken place, and before piston 31 engages piston 26, O-ring 60 will be seated against piston 26 to thus prevent any further escape of fluid through passage 42 and stopping the return of piston 31 due to the preloaded spring 67.

Figure 10:
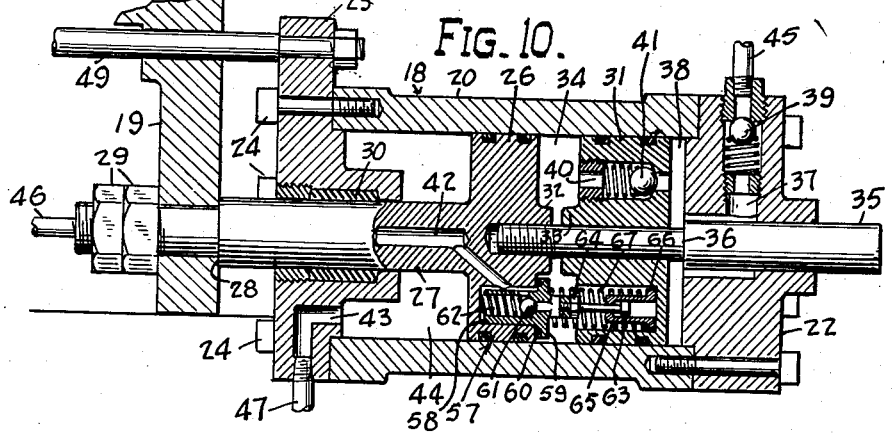
Fig. 10 is a diagrammatic view of the modified cylinder, similar to Fig. 7.

Since piston 31 has not returned the full amount as shown in Fig. 10, the second stroke of the ratcheting cylinder will provide a shorter distance of travel, which will be equal to the initial distance between shoulder 36 and piston 31 minus the distance remaining between piston 26 and piston 31 after piston 31 has been prevented from further return movement by index valve 57.

The second return of piston 31 will exhaust fluid through passage 42, since O-ring 60 has been unseated by the forward stroke. Once again, however, valve 57 will prevent a complete return of piston 31 so that the third and all subsequent strokes will be equal to the second stroke but less than the initial stroke by the amount described above.

When the final return of the ratcheting cylinder to its initial position is made, high pressure will be supplied through passage 43 into chamber 44 to forcefully return the cylinder. This pressure will be sufficient to unseat ball 61 in valve 57 and allow the fluid trapped in chamber 34 to escape through housing 58 and out through passage 42 until bosses 32 and 33 abut. In addition, the higher pressure will cause piston 31 to compress spring 67 sufficiently to permit piston 31 to engage piston 26. The entire assembly will then be returned to the initial or starting position shown in Fig. 8.

The hydraulic cylinder and piston, one of which is fixed and the other movable, together with the floating piston disposed within the cylinder and movable between the cylinder and first named piston, provides a device adapted for controlled movement in increments. The increment setting is infinitely adjustable within the range dictated by the size of the device, and may be operated to provide different increment settings for different strokes. Although the device has been shown and described in relation to a lathe, it may be utilized wherever an increment feed of high selectivity is desired.

Various modes of carrying out the invention are contemplated as within the scope of the following claims particularly pointing out and distinctly claiming the subject matter which is regarded as the invention.

I claim:

1. An infinitely variable increment feed control, comprising hydraulic cylinder and piston members one of which is fixed and the other of which is movable to provide the increment feed, a floating piston disposed for free sliding movement within the cylinder and movable between said first named piston and one end of the cylinder, hydraulic means connected to the interior of said cylinder to reciprocate said floating piston to provide step-by-step incremental movement of the movable member relative to the fixed member, and mechanical stop means disposed a selected distance from said floating piston when the latter is in its initial position to limit the movement of said floating piston and said movable member during each feeding step, said stop means being engageable by said floating piston and regulating the step distance and being infinitely adjustable.

2. An infinitely variable increment feed control, comprising hydraulic cylinder and piston members one of which is fixed and the other of which is movable to provide the increment feed, a floating piston disposed within the cylinder and movable between said first named piston and one end of the cylinder, hydraulic means connected to the interior of said cylinder to reciprocate said floating piston whereby step-by-step incremental movement of the movable member relative to the fixed member is provided, and an adjustment screw threadably disposed within said first-named piston member and extending outwardly therefrom through said floating piston and having means on the outer end thereof adapted to be engaged by said floating piston after a given increment of movement of the floating piston away from said first named piston, said screw being infinitely adjustable to regulate the amount of movement for each increment.

3. An infinitely variable increment feed control comprising, a hydraulic cylinder, a fixed piston disposed within said cylinder with said cylinder being slidable thereon, a floating piston disposed within the cylinder and movable between said fixed piston and one end of the cylinder, hydraulic means connected to the interior of said cylinder to reciprocate said floating piston to provide step-by-step incremental movement of said cylinder, and an adjustment screw threaded into said first named piston and extending outwardly therefrom through said floating piston, said screw having a shoulder thereon to be engaged by said floating piston after a given increment of movement thereof away from said first named piston, said screw being infinitely adjustable within its operating range to regulate the amount of movement for each increment of feed.

4. An infinitely variable increment feed control comprising, a hydraulic cylinder, a fixed piston disposed within said cylinder with said cylinder being slidable thereon, a floating piston disposed for free sliding movement within the cylinder and movable between said fixed piston an one end of the cylinder, means connected to the interior of said cylinder to reciprocate said floating piston to provide step-by-step incremental movement of said cylinder along said fixed piston for each reciprocation of the floating piston, said means including means to retract the floating piston without retracting the cylinder so that said floating piston is positioned for the next feeding step, and stop means disposed a selected distance from said floating piston when the latter is in its initial position to limit the movement of said floating piston and said cylinder during a feeding step, said stop means regulating the step distance and being infinitely adjustable.

5. An infinitely variable increment feed control comprising, a hydraulic cylinder having a front and rear head, a fixed piston disposed within said cylinder and having a piston rod extending outwardly through the front head thereof, said cylinder being slidable on said piston, a floating piston disposed within the cylinder and movable between said fixed piston and the rear head of the cylinder, said floating piston engaging the fixed piston prior to each feeding stroke, means to move the floating piston against the rear head to feed said cylinder outwardly along the fixed piston, an adjustable screw threaded into said fixed piston and extending outwardly therefrom through the rear head and having means thereon for engagement by the floating piston after a given increment of movement thereof to regulate the distance of cylinder feed for each stroke, means to introduce pressurized fluid between the floating piston and said rear head after a given stroke is completed to retract the floating piston so that it engages the fixed piston in preparation for the next stroke, and means to prevent the escape of said fluid from between said floating piston and the adjacent cylinder head during the second and all subsequent feed strokes so that the cylinder will be moved further outwardly by the floating piston during each subsequent stroke.

6. An infinitely variable increment feed control comprising, a hydraulic cylinder having a front and rear head, a fixed piston disposed within said cylinder and having a piston rod extending outwardly through the front head thereof, said cylinder being slidable on said piston, a floating piston disposed within the cylinder and movable between said fixed piston and the rear head of the cylinder, said floating piston engaging the fixed piston prior to each feeding stroke, means to move the floating piston against the rear head to feed said cylinder outwardly along the fixed piston, an infinitely adjustable screw threaded into said fixed piston and extending outwardly therefrom through the rear head and having means thereon for engagement by the floating piston after a given increment of movement thereof to regulate the distance of cylinder feed for each stroke, means to introduce pressurized fluid between the floating piston and said rear head after a given stroke is completed to retract the floating piston so that it engages the fixed piston in preparation for the next stroke, means to prevent the escape of said fluid during the second and all subsequent feed strokes so that the cylinder will be moved further outwardly by the floating piston during each subsequent stroke, means to introduce fluid between said fixed piston and said front head to retract the cylinder to its initial position after the entire incremental feeding cycle is complete, and means to allow escape of said first named fluid upon retraction of the cylinder.

7. An infinitely variable increment feed control comprising, a hydraulic cylinder having a front and rear head, a fixed piston disposed within said cylinder and having a piston rod extending outwardly through the front head thereof, said cylinder being slidable on said piston, a floating piston disposed within the cylinder and movable between said fixed piston and the rear head of the cylinder, said floating piston engaging the fixed piston prior to each feeding stroke, means to move the floating piston against the rear head to feed said cylinder outwardly along the fixed piston, an infinitely adjustable screw threaded into said fixed piston and extending outwardly therefrom through the rear head and having means thereon for engagement by the floating piston after a given increment of movement thereof to regulate the distance of cylinder feed for each stroke, means to introduce pressurized fluid between the floating piston and said rear head after a given stroke is completed to retract the floating piston so that it engages the fixed piston in preparation for the next stroke, means to prevent the escape of said fluid during the second and all subsequent feed strokes so that the cylinder will be moved further outwardly by the floating piston during each subsequent stroke, means to introduce fluid between said fixed piston and said front head to retract the cylinder to its initial position after the entire incremental feeding cycle is complete, and a check valve longitudinally disposed in said floating piston and extending therethrough, said valve being adapted to open on retraction of the cylinder and allow the escape of said first named fluid.

8. An increment feed control comprising, a hydraulic cylinder, a piston disposed within said cylinder, floating means disposed for free sliding movement within said cylinder and reciprocable between said piston and one end of the cylinder to provide relative movement of said piston and cylinder in step-by-step increments, means to reciprocate said floating means during each step portion of a feed cycle, infinitely adjustable means disposed within said cylinder to regulate the step distance in each feeding stroke of the control, and valve means actuated by said floating means to automatically provide a greater increment feed during the first step than during subsequent steps.

9. An infinitely variable increment feed control comprising, a hydraulic cylinder having a piston disposed therein with said cylinder and piston being adapted for relative movement, a floating piston disposed for free sliding movement within the cylinder and reciprocable between said first named piston and one end of the cylinder, hydraulic means connected to the interior of the cylinder to reciprocate said floating piston whereby step-by-step incremental relative movement between said cylinder and said first named piston is provided, infinitely adjustable stop means disposed within said cylinder and engageable with the floating piston to limit said incremental relative movement during a feeding stroke, and valve means disposed within said cylinder and actuated by said floating piston to automatically provide a larger increment feed during the first step of a cycle than during subsequent steps.

10. In an infinitely variable increment feed control having a cylinder and piston adapted for step-by-step relative incremental movement, means floatingly disposed within said cylinder to regulate the step distance in each feeding stroke, and automatic valve means disposed in contact with and actuated by said first named means to provide a greater increment feed during the first step than during subsequent steps.

11. An infinitely variable increment feed control comprising, a hydraulic cylinder having a front and rear head, a fixed piston disposed within said cylinder and having a piston rod extending outwardly through the front head thereof, said cylinder being slidable on said piston, a floating piston disposed within the cylinder and movable between said fixed piston and the rear head of the cylinder, said floating piston engaging the fixed piston prior to each feeding stroke, means to move the floating piston against the rear head to feed said cylinder outwardly along the fixed position, an infinitely adjustable screw threaded into said fixed piston and extending outwardly therefrom through the rear head and having means thereon for engagement by the floating piston after a given increment of movement thereof to regulate the distance of cylinder feed for each stroke, means to introduce pressurized fluid between the floating piston and said rear head after a given stroke is completed to retract the floating piston toward the fixed piston in preparation for the next stroke, means to prevent the escape of said fluid during the second and all subsequent feed strokes so that the cylinder will be moved further outwardly by the floating piston during each subsequent stroke, and means to provide a greater increment feed of the cylinder during the first stroke than during subsequent strokes.

12. An infinitely variable increment feed control comprising, a hydraulic cylinder having a front and rear head, a fixed piston disposed within said cylinder and having a piston rod extending outwardly through the front head thereof, said cylinder being slidable on said piston, a floating piston disposed within the cylinder and movable between said fixed piston and the rear head of the cylinder, said floating piston engaging the fixed piston prior to each feeding stroke, means to move the floating piston against the rear head to feed said cylinder outwardly along the fixed piston, an infinitely adjustable screw threaded into said fixed piston and extending outwardly therefrom through the rear head and having means thereon for engagement by the floating piston after a given increment of movement thereof to regulate the distance of cylinder feed for each stroke, means to introduce pressurized fluid between the floating piston and said rear head after a given stroke is completed to retract the floating piston toward the fixed piston in preparation for the next stroke, means to prevent the escape of said fluid during the second and all subsequent feed strokes so that the cylinder will be moved further outwardly by the floating piston during each subsequent stroke, and means to provide a greater increment feed of the cylinder during the first stroke than during subsequent strokes, said last named means comprising a valve disposed between said fixed piston and said floating piston and adapted to prevent complete retraction of the floating piston against the fixed piston after the first and succeeding feeding strokes of the cylinder.

13. An infinitely variable increment feed control comprising, a hydraulic cylinder having a front and rear head, a fixed piston disposed within said cylinder and having a piston rod extending outwardly through the front head thereof, said cylinder being slidable on said piston, a floating piston disposed within the cylinder and movable between said fixed piston and the rear head of the cylinder, said floating piston engaging the fixed piston prior to each feeding stroke, means to introduce pressurized fluid between the floating piston and the fixed piston to move the floating piston against the rear head to feed said cylinder outwardly along the fixed piston, an infinitely adjustable screw threaded into said fixed piston and extending outwardly therefrom through the rear head and having means thereon for engagement by the floating piston after a given increment of movement thereof to regulate the distance of cylinder feed for each stroke, means to introduce pressurized fluid between the floating piston and said rear head after a given stroke is completed to retract the floating piston toward the fixed piston in preparation for the next stroke, means to prevent the escape of said last named fluid during the second and all subsequent feed strokes so that the cylinder will be moved farther outwardly by the floating piston during each subsequent stroke, and means to provide a greater increment feed of the cylinder during the first stroke than during subsequent strokes, said last named means comprising a valve disposed between said fixed piston and said floating piston and adapted to prevent the escape of said first named fluid after a partial retraction of the floating piston following the first and each succeeding stroke of the cylinder to prevent engagement of the floating piston with the fixed piston.

14. In a machine tool or the like having a headstock and a spindle disposed within the headstock and adapted to rotate a workpiece, said machine tool also having a bed adapted to support a movable carriage with the carriage supporting a transversely movable tool holder, an increment feed control to advance the tool holder to provide a number of passes of the tool in machining the workpiece, said control comprising a hydraulic cylinder, a fixed piston disposed within said cylinder and extending outwardly therefrom for securement to the carriage, a floating piston disposed within the cylinder and freely movable between said fixed piston and one end of the cylinder, means to move said floating piston away from said fixed piston to provide step-by-step incremental movement of said cylinder along said fixed piston, stop means engageable by said floating piston to limit the movement of said floating piston and said cylinder during a feeding stroke, said stop means regulating the stroke distance and being infinitely adjustable, and cam means attached to said cylinder and adapted to advance the tool holder toward the workpiece during each feeding stroke of the control.

15. In a machine tool or the like having a headstock and a spindle disposed within the headstock and adapted to rotate a workpiece, said machine tool also having a bed adapted to support a movable carriage with the carriage supporting a transversely movable tool holder, an increment feed control to advance the tool holder to provide a number of passes of the tool in machining the workpiece, said control comprising a hydraulic cylinder, a fixed piston disposed within said cylinder and extending outwardly therefrom for securement to the carriage, a floating piston disposed within the cylinder and movable between said fixed piston and one end of the cylinder, means to move said floating piston away from said fixed piston to provide step-by-step incremental movement of said cylinder along said fixed piston, stop means to limit the movement of said floating piston and said cylinder during a feeding stroke, said stop means regulating the stroke distance and being infinitely adjustable, cam means attached to said cylinder and adapted to advance the tool holder toward the workpiece during each feeding stroke of the control, and valve means disposed in contact with said floating piston and actuated thereby to automatically provide a greater increment feed for the tool during the first stroke of a cycle than during subsequent strokes.

16. In a machine tool or the like having a headstock and a spindle disposed within the headstock and adapted to rotate a workpiece, said machine tool also having a bed adapted to support a movable carriage with the carriage supporting a transversely movable tool holder, an increment feed control to advance the tool holder to provide a number of passes of the tool in machining the workpiece, said control comprising a hydraulic cylinder, a fixed piston disposed within said cylinder and extending outwardly therefrom for securement to the carriage, a floating piston disposed within the cylinder and movable between said fixed piston and one end of the cylinder, means to move said floating piston away from said fixed piston to provide step-by-step incremental movement of said cylinder along said fixed piston, stop means to limit the movement of said floating piston and said cylinder during a feeding stroke, said stop means regulating the stroke distance and being infinitely adjustable, cam means attached to said cylinder and adapted to advance the tool holder toward the workpiece during each feeding stroke of the control, and means to retract the floating piston after each feeding stroke is completed so that the floating piston engages the fixed piston in preparation for the next stroke.

17. In a machine tool or the like having a headstock and a spindle disposed within the headstock and adapted to rotate a workpiece, said machine tool also having a bed adapted to support a movable carriage with the carriage supporting a transversely movable tool holder, an increment feed control to advance the tool holder to provide a number of passes of the tool in machining the workpiece, said control comprising a hydraulic cylinder, a fixed piston disposed within said cylinder and extending outwardly therefrom for securement to the carriage, a floating piston disposed within the cylinder and movable between said fixed piston and one end of the cylinder, means to move said floating piston away from said fixed piston to provide step-by-step incremental movement of said cylinder along said fixed piston, stop means to limit the movement of said floating piston and said cylinder during a feeding stroke, said stop means regulating the stroke distance and being infinitely adjustable, cam means attached to said cylinder and adapted to advance the tool holder toward the workpiece during each feeding stroke of the control, means to retract the floating piston toward the fixed piston after each feeding stroke is completed and in preparation for the next stroke, and means to provide a greater feed of the cylinder during the first stroke than during subsequent strokes, said last named means comprising a valve disposed between said fixed piston and said floating piston and adapted to prevent complete retraction of the floating piston after each feeding stroke of the cylinder to prevent engagement of the floating piston with the fixed piston.

18. An infinitely variable step-by-step increment feed control comprising, a hydraulic cylinder, a piston disposed within said cylinder, a floating piston disposed within the cylinder and movable between said first-named piston and one end of the cylinder, first hydraulic means adapted to connect a source of high pressure fluid to the interior of the cylinder, second hydraulic means adapted to connect a source of low pressure fluid to the interior of the cylinder, valve means to supply high pressure fluid through said first hydraulic means whereby said floating piston is moved in a feed direction between said first piston and the cylinder end to provide a relative step movement therebetween, valve means to supply low pressure fluid through said second hydraulic means whereby said floating piston is retracted from its forward position to a position in readiness for the next forward step, and stop means disposed within said cylinder to limit the distance of relative movement between the cylinder and first piston during each feeding step.

19. The control of claim 18 which includes valve means connected to the interior of said cylinder whereby retraction of the control to its initial position is effected upon supplying of high pressure fluid to said cylinder from said high pressure source.

20. The control of claim 18 which includes valve means disposed in connection with said floating piston to provide a greater increment of relative movement between said cylinder and first piston during the first step of a feed stroke than during subsequent steps.

References Cited in the file of this patent

UNITED STATES PATENTS

| | | |
|---|---|---|
| 2,478,790 | Stephens | Aug. 9, 1949 |
| 2,531,340 | Mathys | Nov. 21, 1950 |
| 2,596,471 | Densmore | May 13, 1952 |
| 2,614,536 | Livers | Oct. 21, 1952 |
| 2,631,480 | Romine et al. | Mar. 17, 1953 |
| 2,637,237 | Montgomery | May 5, 1953 |